US010090549B2

(12) United States Patent
Di Iorio et al.

(10) Patent No.: US 10,090,549 B2
(45) Date of Patent: Oct. 2, 2018

(54) METHOD OF FABRICATING CONTACT ELEMENTS IN AN ELECTROCHEMICAL DEVICE SUCH AS SOFC OR EHT

(71) Applicant: COMMISSARIAT A L'ENERGIE ATOMIQUE ET AUX ENERGIES ALTERNATIVES, Paris (FR)

(72) Inventors: Stephane Di Iorio, Lans-en-Vercors (FR); Bertrand Morel, Saint Martin le Vinoux (FR); Cyril Rado, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 34 days.

(21) Appl. No.: 14/412,996

(22) PCT Filed: Jun. 24, 2013

(86) PCT No.: PCT/FR2013/051462
§ 371 (c)(1),
(2) Date: Jan. 5, 2015

(87) PCT Pub. No.: WO2014/006298
PCT Pub. Date: Jan. 9, 2014

(65) Prior Publication Data
US 2015/0194693 A1 Jul. 9, 2015

(30) Foreign Application Priority Data
Jul. 5, 2012 (FR) ..................... 12 56474

(51) Int. Cl.
| | | |
|---|---|---|
| H01M 8/1246 | (2016.01) | |
| H01M 8/2404 | (2016.01) | |
| C25B 9/18 | (2006.01) | |
| H01M 8/1213 | (2016.01) | |
| H01M 8/2425 | (2016.01) | |
| H01M 8/0217 | (2016.01) | |
| H01M 8/0228 | (2016.01) | |
| C25B 1/06 | (2006.01) | |
| C25B 9/06 | (2006.01) | |
| H01M 8/124 | (2016.01) | |

(52) U.S. Cl.
CPC ............. *H01M 8/1246* (2013.01); *C25B 1/06* (2013.01); *C25B 9/06* (2013.01); *C25B 9/18* (2013.01); *H01M 8/0217* (2013.01); *H01M 8/0228* (2013.01); *H01M 8/1213* (2013.01); *H01M 8/2404* (2016.02); *H01M 8/2425* (2013.01); *H01M 2008/1293* (2013.01); *Y02E 60/366* (2013.01); *Y10T 29/49204* (2015.01)

(58) Field of Classification Search
CPC ............. H01M 8/1246; H01M 8/1213; H01M 8/1245; H01M 2008/1293; C25B 9/06; Y02E 60/525
See application file for complete search history.

(56) References Cited

U.S. PATENT DOCUMENTS

| | | | |
|---|---|---|---|
| 8,163,434 B2 * | 4/2012 | Kebbede ............. | C23C 18/1216 427/115 |
| 9,597,708 B2 * | 3/2017 | Wu ......................... | B05D 5/12 |
| 2004/0247971 A1 * | 12/2004 | Sarin ................... | H01M 8/1213 429/482 |
| 2007/0178004 A1 | 8/2007 | Laatsch et al. | |
| 2012/0064436 A1 | 3/2012 | Koo et al. | |

FOREIGN PATENT DOCUMENTS

WO  2009094289 A2  7/2009

OTHER PUBLICATIONS

International Search Report dated Sep. 16, 2013 re: PCT/FR2013/051462; citing: US 2012/064436 A1, US 2007/178004 A1 and WO 2009/094289 A2.

* cited by examiner

*Primary Examiner* — Ula Corinna Ruddock
*Assistant Examiner* — Thomas H Parsons
(74) *Attorney, Agent, or Firm* — Cantor Colburn LLP

(57) ABSTRACT

The invention relates to a method of fabricating a contact element in an electrochemical device (9) such as an SOFC or an EHT which comprises the following steps: a) use is made of: at least one cell (8) consisting of an assemblage made up of an electrode to be hydrogenated (5)-electrolyte (4)-electrode to be oxygenated (3); at least one first interconnector (1); and at least one second interconnector (7); b) at least one layer of a conducting material is deposited on the first interconnector (1) and/or the second interconnector (7); c) an electrochemical device (9) is assembled; said method being characterized in that: d) a thermomechanical treatment is carried out on the electrochemical device obtained on completion of step c). The invention also relates to an electrochemical device (9) equipped with at least one contact element (2) obtained according to this fabrication method.

20 Claims, 2 Drawing Sheets

METHOD OF FABRICATING CONTACT ELEMENTS IN AN ELECTROCHEMICAL DEVICE SUCH AS SOFC OR EHT

TECHNICAL FIELD

The present invention concerns a method for manufacturing a contact element in an electrochemical device such as:
- the solid oxide fuel cells (hereinafter abbreviated as "SOFC", according to the acronym Solid Oxide Fuel Cells),
- the high-temperature solid oxide electrolyzers (hereinafter abbreviated as HTE, according to the acronym High-Temperature Electrolyzer but also known under the abbreviation "SOEC" according to the acronym Solid Oxide Electrolyzer Cell).

BACKGROUND

In the scope of the present invention, we mean by electrochemical device, a device which comprises:
- at least one cell comprising a hydrogen electrode-electrolyte-oxygen electrode assembly,
- at least two contact elements disposed on the hydrogen electrode and the oxygen electrode,
- at least two interconnectors disposed on each of the contact elements.

The interconnector is metallic and ensures the junction between two adjacent cells.

In a HTE-type electrochemical device, the water molecule is dissociated into dihydrogen at the hydrogen electrode (cathode), the $O^{2-}$ ions migrate through the electrolyte to recombine into dioxygen at the oxygen electrode (anode) side. Hence, the function of the cell is to produce dihydrogen by dissociating water molecules.

In a SOFC-type electrochemical device, oxygen is reduced at the oxygen electrode (cathode), the $O^{2-}$ ions migrate through the electrolyte to be oxidized by dihydrogen at the hydrogen electrode (anode). Hence, the function of the cell is to produce electricity by combining dihydrogen and dioxygen.

The interconnector conveys the current and distributes the gases (water vapor, dioxygen, dihydrogen, and possibly a carrier gas such as dinitrogen).

The contact element improves the electrical contact between the metallic interconnector and the electrode (namely the hydrogen electrode or the oxygen electrode).

An electrochemical device as described above is favored as a means for converting the chemical energy of a fuel into electrical energy if it is more effective than the other known means for converting the chemical energy into electrical energy.

The performance of such a chemical device is assessed by its effectiveness in producing electrical energy thanks to the electrochemical reactions implemented within the cell. This effectiveness is related to the quality of the electrical contacts established between the interconnectors and the electrodes, and this thanks to the contact elements.

Indeed, any ohmic loss in an electrochemical device is detrimental, because it contributes to decreasing its overall efficiency. In this regard, the ohmic losses are particularly significant and hence problematic in the case of electrochemical devices.

Therefore, it is sought to improve the quality of the electrical contacts between the interconnectors and the electrodes in order to increase the performances of these electrochemical devices.

In an electrochemical device, at the hydrogen electrode side, a nickel grid is conventionally used and it provides satisfactory results, and this at low costs.

But, the contact elements which ensure the passage of the current at the oxygen electrode side are currently the subject of numerous studies in order to improve their quality, and this while seeking for the lowest manufacturing costs.

It is known to use gold grids as contact elements at the oxygen electrode side. This material is soft and thus exhibits a good mechanical accommodation capacity, for example for:
- filling the flatness defects,
- smoothing a surface exhibiting a significant roughness of the electrode and/or the interconnector, Moreover, gold also has the advantage of being a good electrical conductor and having an excellent corrosion resistance.

Thus, the mechanical properties and the good electrical conductivity of gold allow obtaining a good electrical contact between the interconnector and the electrode and make the gold grid an appropriate embodiment as a contact element in an electrochemical device such as a SOFC or a HTE.

However, such a material has the drawback of being very expensive. Hence, it is not especially interesting, from an economic point of view, to use it as a contact element, due to the fact that it contributes to maintain high the production cost of an electrochemical device such as a SOFC or a HTE.

Therefore, other embodiments of contact elements, manufactured from more economically interesting materials, have been implemented. They consist of ceramic materials. But, these materials have the drawback of having a mechanical accommodation capacity which is not as effective as that of a gold grid.

Thus, to date, none of the embodiments of the contact elements known from the prior art is fully satisfactory to reconcile the following parameters:
- a high conductivity;
- a capacity of mechanical accommodation to the surface irregularities that the interconnectors and the electrodes may comprise;
- a low cost of their constitutive materials for not impeding their use, for economic reasons, in electrochemical devices such as SOFCs and HTEs.

BRIEF SUMMARY

The present invention proposes to overcome all the drawbacks detailed above related to the contact elements of the prior art by proposing, from low cost materials, a quite innovative method for manufacturing contact elements of an electrochemical device such as a SOFC or a HTE, leading to obtaining more effective contact elements, due to the fact that they combine both a high conductivity and a particularly advantageous mechanical accommodation capacity.

The invention provides a method for manufacturing a contact element of an electrochemical device such as a SOFC or a HTE which comprises the following steps:
a) there are disposed:
  at least one cell comprising a hydrogen electrode-electrolyte-oxygen electrode assembly,
  at least a first interconnector;
  at least a second interconnector;

b) at least one layer of a conductive material is deposited over the first interconnector and/or the second interconnector;

c) an electrochemical device is assembled by disposing the cell between the first interconnector and the second interconnector so that the conductive material layer is in contact with the oxygen electrode and/or the hydrogen electrode of the cell;

said method being characterized in that:

d) a thermo-mechanical treatment is carried out on the electrochemical device obtained at the end of step c) so as to form at least one contact element, the thermo-mechanical treatment comprising concomitantly subjecting the electrochemical device to a temperature comprised between 850° C. and 1200° C. and applying thereto a mechanical stress comprised between 0.01 and 10 MPa.

In the scope of the present invention, "applying a mechanical stress" means that a pressure, which corresponds to a force exerted over a surface, is applied. It consists of a relative pressure, because it corresponds to the pressure difference relative to atmospheric pressure.

The manufacturing method according to the invention is carried out at atmospheric pressure and when step d) is performed, an additional mechanical stress (or in other words a relative pressure) is applied on the electrochemical device.

The conductive material exhibits, at least for a period of time during the thermo-mechanical treatment of step d), a porosity comprised between 30% and 80%, preferably comprised between 40% and 70%.

According to a preferred embodiment of the invention, at the end of the assembly step c) and prior to the step d) of thermo-mechanical treatment, the electrochemical device is heated to its nominal operating temperature, namely to a temperature which is comprised between about 600° C. and about 900° C., preferably about 800° C.

According to one embodiment of the invention, at the end of the step d) of thermo-mechanical treatment, the temperature of the electrochemical device is lowered to the nominal operating temperature of the electrochemical device, namely to a temperature which is comprised between 600° C. and 900° C., preferably about 800° C. Preferably, before lowering the temperature of the electrochemical device, the mechanical stress is decreased at most 90% of its value. In this embodiment of the invention, the decrease of the temperature is then performed while still maintaining a mechanical stress on the electrochemical device.

The thermo-mechanical treatment of step d) provides the following advantages:

an increase in the contact surface between the electrode and the interconnector;

a good cohesion between the grains of the conductive material and thus a good mechanical accommodation between the electrode and the interconnector, because the surface defects of these elements of the electrochemical device are filled.

In addition, it has been observed that the electrochemical devices equipped with contact elements manufactured according to the method of the invention protect the interconnectors against corrosion, and this unlike the gold grid used as a contact element at the oxygen electrode side.

Thus, besides the economic aspect, the contact elements obtained according to the method of the invention are more advantageous than the gold grid.

Thanks to the method for manufacturing contact elements according to the invention, the contact resistances between the interconnectors and the electrodes of the electrochemical device such as a SOFC or a HTE are decreased. Consequently, the performance of the electrochemical device equipped with such contact elements is improved in comparison with other devices comprising contact elements produced from ceramic materials, and this with the advantages that yet neither its manufacturing cost nor its structure are modified.

Although the contact element in form of a nickel grid, at the hydrogen electrode side, is satisfactory in electrochemical devices such as SOFCs or HTEs, it should be noted that the method for manufacturing a contact element according to the invention may be implemented for manufacturing both:

contact elements ensuring electrical contact between the interconnectors and the oxygen electrodes of the electrochemical device, and contact elements ensuring electrical contact between the interconnectors and the hydrogen electrodes of the electrochemical device.

Certainly, the manufacturing method according to the invention will be advantageously implemented for manufacturing contact elements ensuring electrical contact between the interconnectors and the oxygen electrodes for which, to date, there has been no satisfactory implementation.

Therefore, advantageously, in step b), at least one conductive material layer is deposited over the first interconnector and in step c), an electrochemical device is constituted by disposing the cell between the first interconnector and the second interconnector, so that the conductive material layer is in contact with the oxygen electrode of the cell.

Preferably, the first interconnector and the second interconnector are metallic and made of a stainless steel, for example CROFER® 22 APU, commercialized by the ThyssenKrupp VDM company. Preferably, the metallic interconnectors further comprise a corrosion protection layer. It may consist of a layer of a material which comprises $Co_2MnO_4$.

This corrosion protection layer allows avoiding the deterioration of the interconnector during the use of the electrochemical device which is generally performed at a temperature in the order of 700° C. to 800° C., and this for about 30,000 to 40,000 hours.

In this regard, it should be noted that the thermo-mechanical treatment, although carried out at temperatures in the order of 850° C. to 1200° C., does not substantially deteriorate the interconnectors of the electrochemical device, since the duration of the thermo-mechanical treatment is very short (in the order of few hours) in comparison with that of a normal use of the electrochemical device. Thus, there is produced no, or only in a limited manner, corrosion phenomenon at the interconnectors during the thermo-mechanical treatment.

Of course, the first interconnector and the second interconnector may be produced from other materials which are commonly used in the electrochemical devices such as the SOFCs and the HTEs and which are perfectly within the reach of those skilled in the art.

Advantageously, the conductive material is a material whose electrical conductivity is at least 0.1 $S \cdot cm^{-1}$ under air at 800° C., and preferably greater than 1 $S \cdot cm^{-1}$ under air at 800° C.

The selection of an appropriate conductive material for the production of quality contact elements is within the reach of those skilled in the art. Indeed, the manufacturing method according to the invention does not modify the value of the electrical conductivity of the conductive material constitutive of the contact element manufactured during this method.

The conductive material may be selected among the materials of which are constituted the oxygen electrodes.

Preferably, the conductive material is a conductive ceramic material which is inert to the constitutive materials of the electrode, and this at the thermo-mechanical treatment temperatures, namely comprised between 850° C. and 1200° C. In this way, there is no risk of generation of new non-conductive components during the method for manufacturing contact elements according to the invention.

In an advantageous embodiment of the invention, the conductive material is selected among the conductive ceramic materials, namely those whose electrical conductivity is greater than 0.1 S·cm$^{-1}$ under air at 800° C., for example comprised between 0.1 and 10 S·cm$^{-1}$ under air at 800° C.

Preferably, the ceramic material is non-sintered in order to confer some flexibility thereto, and to obtain a significant porosity and a good crushing capacity.

Advantageously, the conductive material is a conductive ceramic and may be selected in the group consisting of:
$La_{0.6}Sr_{0.4}Co_{0.8}Fe_{0.2}O_3$ (abbreviated as LSCF);
$La_{0.8}Sr_{0.2}Cu_{0.9}Fe_{0.1}O_{2.5}$ (abbreviated as LSCuF);
$La_{0.7}Sr_{0.3}CoO_3$ (abbreviated as LSC);
$Sm_{0.5}Sr_{0.5}CoO_3$ (abbreviated as SSC);
$SmBa_{0.5}Sr_{0.5}Co_2O_5$ (abbreviated as SBSC);
$GdSrCo_2O_5$ (abbreviated as GSC);
$La_{0.65}Sr_{0.3}MnO_3$ (abbreviated as LSM);
$LaBaCo_2O_5$ (abbreviated as LBC);
$YBaCo_2O_5$ (abbreviated as YBC);
$Nd_{1.8}Ce_{0.2}CuO_4$ (abbreviated as NCC);
$La_{0.8}Sr_{0.2}Co_{0.3}Mn_{0.1}Fe_{0.6}O_3$ (abbreviated as LSCMF);
$La_{0.98}Ni_{0.6}Fe_{0.4}O_3$ (abbreviated as LNF);
$La_{1.2}Sr_{0.8}NiO_4$ (abbreviated as LSN);
$La_{0.7}Sr_{0.3}FeO_3$ (abbreviated as LSF);
$La_2Ni_{0.6}Cu_{0.4}O_4$ (abbreviated as LNC).

In a quite advantageous manner, the conductive ceramic material is selected in the group comprising the LSM (or in other words the strontium doped lanthanum manganite), the LSC (or in other words the strontium doped lanthanum cobaltite), the LNF (or in other words the lanthanum nickel ferrite), and the LSCF (or in other words the strontium doped lanthanum ferro-cobaltite).

According to one embodiment of the invention, when a conductive material layer is in contact with the hydrogen electrode, the conductive material may be a mixture of at least one ceramic and at least one metal. This embodiment has the advantage that the ceramic is not necessarily conductive, since the required electrical conductivity for contact elements of an electrochemical device such as a SOFC or a HTE may be obtained thanks to the metal present in the mixture.

For example, it may consist of a mixture of the YSZ ceramic (namely a zirconia stabilized with yttrium oxide) with nickel which has been shaped at high temperature (1300-1450° C.) by sintering powders of nickel oxide and YSZ ceramic. The molar proportions of the metal and of the ceramic may be in the order of 50/50. Advantageously, the quantity of metal may be more significant than that of the ceramic so as to increase the electrical conductivity of this conductive material.

Of course, this embodiment of the invention is not appropriate for the case of a contact element in contact with an oxygen electrode, due to the fact that if the conductive material constitutive of this contact element contains metal, the metal will oxidize and consequently will no longer be conductive.

In step b) of the method according to the invention, the conductive material layer may be deposited thanks to one of the following techniques: screen printing, spray, or even brushing. Of course, the deposition of the conductive material layer may be performed with other techniques within the reach of those skilled in the art which allow preserving a crushing capacity of the conductive material layer on the metallic interconnector.

Preferably, the technique for depositing the conductive material layer is the screen printing or the spraying.

Advantageously, the conductive material layer has a thickness comprised between 1 and 500 μm, preferably a thickness in the order of 80 to 100 μm.

The conductive material may be deposited either in one single layer or in several subsequent layers, depending on the thickness of each deposited layer and on the desired thickness of the conductive material layer.

In one embodiment of the invention, a conductive material layer of 80 μm is obtained by subsequently depositing 4 layers of 20 μm.

The porosity of the conductive material layer is the ratio of the void volume to the total volume of the material layer.

The conductive material exhibits, at least for a period of time during the thermo-mechanical treatment of step d), a porosity comprised between 30% and 80%, preferably comprised between 40% and 70%.

If this porosity is less than 30%, the conductive material will not be able to be sufficiently crushed during the step d) of thermo-mechanical treatment, and thus the aforementioned mechanical accommodation will not be fully satisfactory.

A porosity greater than 50% has the advantage of an easier crushing of the conductive material and thus allows lowering the temperature required for satisfactorily performing the thermo-mechanical treatment.

But a porosity greater than 80% risks to make the conductive material brittle and fragile during the step d) of thermo-mechanical treatment.

In one embodiment of the invention, at least one layer of a conductive material having an appropriate porosity, namely a porosity comprised between 30% and 80%, preferably between 40% and 70%, is deposited, during step b), over the at least a first interconnector and/or the at least a second interconnector.

In another embodiment of the invention, at least one layer of a conductive material comprising at least one pore-forming agent is deposited, during step b), over the first interconnector and/or the second interconnector.

The pore-forming agent is advantageously selected in the group consisting of the carbon black, the methyl methacrylate, the polystyrene, the starch, the potato starch. The selection of an appropriate pore-forming agent is within the reach of those skilled in the art.

The porosity of the conductive material is then obtained, in this embodiment of the invention, during the thermo-mechanical treatment of step d) under the effect of temperature which is, recall it, at least about 850° C. Indeed, the pore-forming agents burn from temperatures in the order of 350° C. to 450° C.

During the step d) of thermo-mechanical treatment, the temperature is comprised between about 850° C. to 1200° C. The upper limit of the temperature implemented during this step d) is limited by the risk of ageing of the other elements of the electrochemical device (the electrodes, the electrolyte and the interconnectors).

However, a high temperature, in the order of 950° C. is recommended, because that creates a beginning of sintering (or in other words a creation of a bridge between grains or even a coalescence of the material grains) of the conductive material layer and thus promotes a good mechanical accommodation.

It should be noted that the thermo-mechanical treatment is carried out at a temperature comprised between 850° C. and 1200° C., namely a temperature higher than the temperature of use of the electrochemical device which is generally comprised between 600° C. and 900° C.

During the thermo-mechanical treatment, the temperature may increase and then decrease. The range of heating and/or cooling rate may be comprised between 0.5° C./min and 500° C./min, preferably between 1 and 5° C./min, during the step d) of thermo-mechanical treatment.

A rapid heating rate, higher than or equal to 5° C. exhibits the advantage of shaping the conductive material layer, and this without causing ageing of the other elements of the electrochemical device.

Conversely, a very slow heating rate promotes the creep-type deformations, the conductive material layer being put in place slowly. A compromise between the duration of the thermo-mechanical treatment (related to the heating rate) and the temperature reached during this thermo-mechanical treatment is to be set up based on the selected conductive material, on its microstructure and on its porosity. This set-up is perfectly within the reach of those skilled in the art.

In an advantageous embodiment of the invention, the electrochemical device may be configured so that during the step d) of thermo-mechanical treatment, the whole electrochemical device remains at the nominal operating temperature, namely at a temperature in the order of 800° C.; except the conductive material layer which is subjected to a temperature comprised between 850° C. and 1200° C. In other words, only the conductive material layer undergoes the temperature variations during the step d) of thermo-mechanical treatment.

According to one embodiment of the invention, the interconnector over which the conductive material layer is deposited constitutes a heating system, because the passage of electricity in a conductive material tends to heat the latter by Joule effect. Indeed, the interconnector, preferably made of a stainless steel, has an appropriate thermal conductivity, namely in the order of 25 $W \cdot m^{-1} \cdot K^{-1}$.

The range of mechanical stress applied during the step d) of thermo-mechanical treatment may be comprised between 0.01 MPa and 10 MPa, preferably between 0.05 and 5 MPa.

A high mechanical stress, in the order of 0.1 MPa allows for a significant deformation of the conductive material layer, and hence a good mechanical accommodation between the electrode and the interconnector. In addition, a high mechanical stress has the advantage of decreasing the temperature of the thermo-mechanical treatment, thus allowing to preserve to a maximum the other elements of the electrochemical device (the electrodes, the electrolyte and the interconnectors) from a possible degradation.

However, the mechanical stress should not be too high, that is to say greater than 10 MPa to avoid any risk of breakage of the electrochemical device.

Advantageously, the maximum mechanical stress which is applied should be applied when the temperature has reached its maximum value during the thermo-mechanical treatment, so as to couple the effects of the temperature and of the mechanical stress on the deformation of the conductive material layer.

In one embodiment of the invention, the mechanical stress is exerted during a time period comprised between 1 second and 10 hours, and preferably between 5 minutes and 5 hours. The duration of the thermo-mechanical treatment of step d) depends both on the temperature and on the applied mechanical stress.

By way of example, once the nominal operating temperature of the electrochemical device is reached, namely a temperature in the order of 800° C., a thermo-mechanical treatment may be carried out as follows:

A mechanical stress of 0.1 MPa is exerted while increasing the temperature from 800° C. to 920° C., with a heating rate of 1° $C. \cdot min^{-1}$;

The temperature is maintained at 920° C. and the mechanical stress of 0.1 MPa is maintained for half an hour;

The temperature is decreased from 920° C. to 860° C. with a cooling rate of 1° $C. \cdot min^{-1}$ while maintaining the mechanical stress of 0.1 MPa;

The temperature is maintained at 860° C. and the mechanical stress of 0.1 MPa is maintained for one hour.

Finally, the temperature is decreased from 860° C. to 800° C. with a cooling rate of 1° $C. \cdot min^{-1}$ while maintaining the mechanical stress of 0.1 MPa.

At the end of the method for manufacturing contact elements according to the invention (namely when the contact elements have been set up in the electrochemical device), the electrochemical device is brought back to the nominal operating temperature of the electrochemical device which in the order of 800° C., and this for its entire duration of use.

The invention also concerns an electrochemical device such as a SOFC or a HTE equipped with at least one contact element obtained with the manufacturing method as described above.

The invention will be better understood from the detailed description which is given below with reference to the appended drawing representing schematically, by way of non-limiting example, an embodiment of an electrochemical device within the meaning of the present invention (namely it may consists of a SOFC or a HTE), as well as experimental results presented in form of graphs.

DETAILED DESCRIPTION

Figure 1:
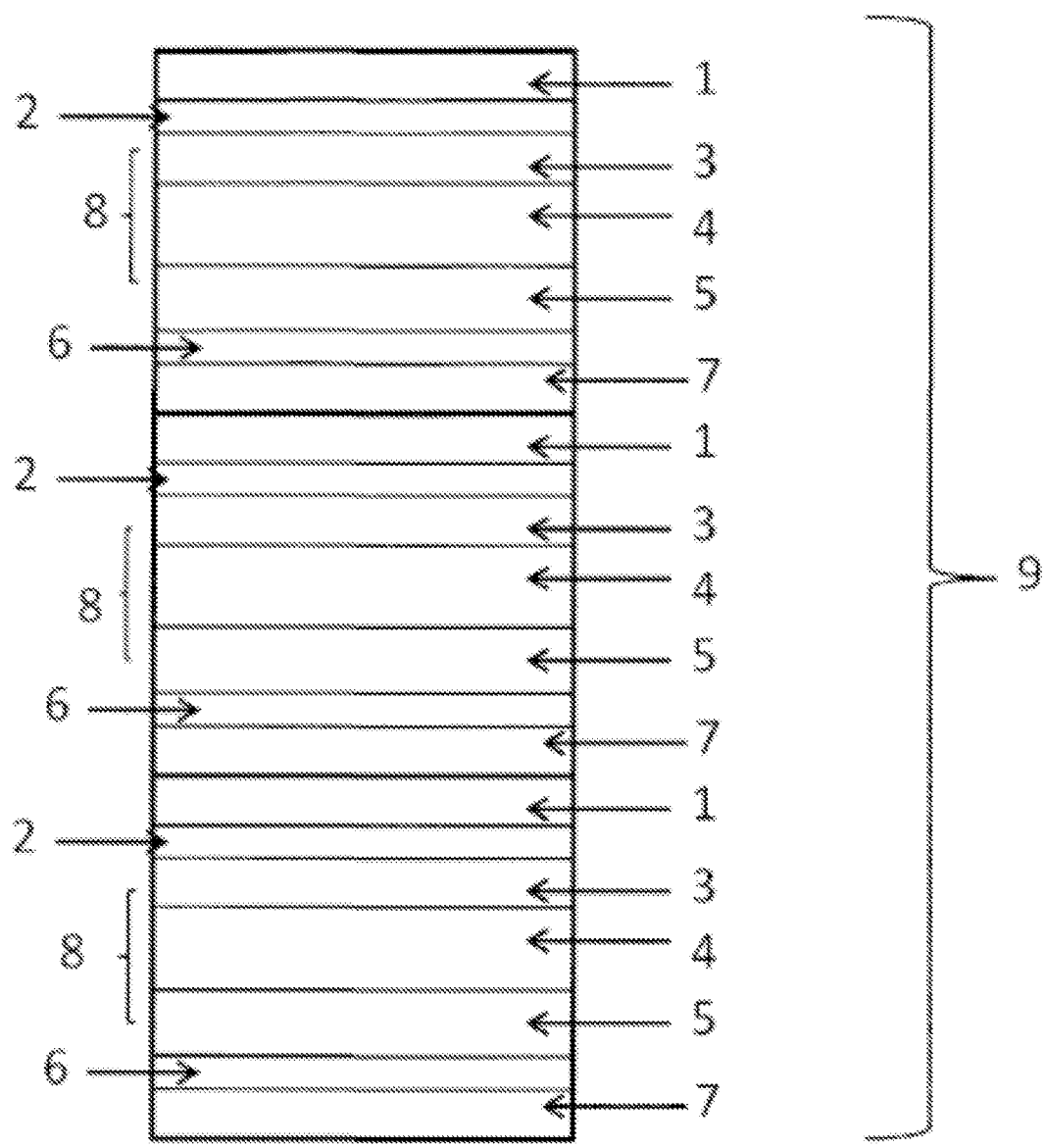
FIG. 1 is a schematic longitudinal sectional view of an electrochemical device equipped with contact elements obtained according to the manufacturing method of the invention.

In FIG. 1, there is schematically represented an electrochemical device 9 within the meaning of the present invention (namely it may consist of a SOFC or a HTE) which comprises:

three cells 8 each comprising an oxygen electrode 3-electrolyte 4-hydrogen electrode 5 assembly;
three first interconnectors 1;
three second interconnectors 7;
three contact elements 6 in form of nickel grids;
three contact elements 2 obtained according to the method for manufacturing contact elements according to the invention.

Experimental Part:

Experiment No 1:

There were provided:

a cell comprising an oxygen electrode-electrolyte-oxygen electrode assembly. This type of cell allows obtaining a symmetrical configuration for the electrochemical system and simplifying the study of the contact resistances of the oxygen electrode.
a first metallic interconnector;
a second metallic interconnector.

The electrodes were LSM electrodes, the electrolyte was a zirconia doped with 3% of yttrium and the interconnectors were made of Crofer®.

There were deposited by screen printing four layers of porous LSM with a porosity in the order of 50% having a total thickness of 100 μm over each one of the two metallic interconnectors.

An electrochemical device was constituted by disposing the cell between the first metallic interconnector and the second metallic interconnector so that the porous LSM deposit is in contact with the oxygen electrodes of the symmetrical cell.

The following operations were carried out successively:

1) The device was heated up to 800° C., and this with a temperature gradient of 5° C./min with a mechanical stress of 0.1 MPa.

2) Next, the temperature was maintained at 800° C. for a time period of about 15 hours, and this while maintaining the mechanical stress of 0.1 MPa.

3) Next, a thermo-mechanical treatment was carried out on the electrochemical device as follows:

A mechanical stress of 0.1 MPa was applied while increasing the temperature from 800° C. to 920° C., with a heating rate of 1° C.·min$^{-1}$;
The temperature of 920° C. and the mechanical stress of 0.1 MPa were maintained for half an hour;
The temperature was decreased from 920° C. to 860° C. with a cooling rate of 1° C.·min$^{-1}$ while maintaining the mechanical stress of 0.1 MPa;
The temperature of 860° C. and the mechanical stress of 0.1 MPa were maintained for one hour.
Finally, the temperature was decreased from 860° C. to 800° C. with a cooling rate of 1° C.·min$^{-1}$ while maintaining a mechanical stress of 0.1 MPa.

The thermo-mechanical treatment lasted about 6 hours. In addition, this step 3) corresponded to a thermo-mechanical treatment as implemented in the method for manufacturing contact elements according to the invention.

4) At the end of this thermo-mechanical treatment, the electrochemical device was maintained at a temperature of 800° C. while maintaining the application of a mechanical stress of 0.1 MPa for about 3 hours.

During these steps 1) to 4), the contact resistance of the porous LSM layer was constantly calculated from the high-frequency resistance measured by performing an electrochemical impedance spectroscopy.

Figure 2:
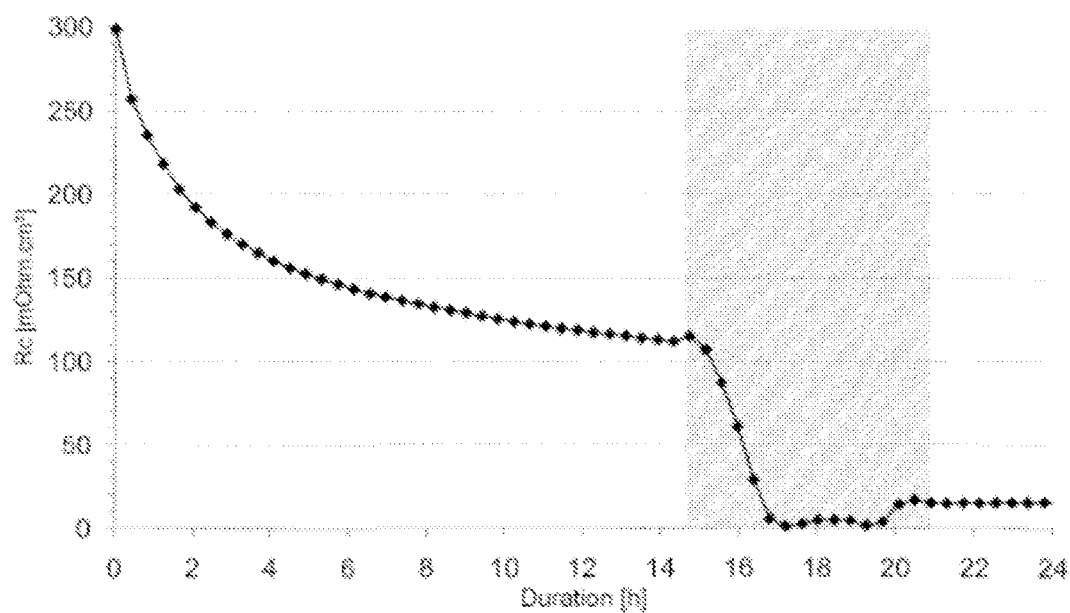
FIG. 2 is a graph of the contact resistance as a function of time, of a deposit of 100 μm of porous LSM under the effect of a mechanical stress of 0.1 MPa.

FIG. 2 is a graph expressing the thus measured contact resistance as a function of time.

In this graph, the time interval during which the electrochemical device has been subjected to the thermo-mechanical treatment detailed above appears in the form of a shaded area.

In view of the graph of FIG. 2, the following points are raised:

The contact resistance decreased from 300 mOhm·cm$^2$ to 112 mOhm·cm$^2$ when the electrochemical device was maintained at 800° C. and under a mechanical stress of 0.1 MPa. The contact resistance was already almost constant after about ten hours.

The contact resistance then decreased significantly during the thermo-mechanical treatment passing from a value of 112 mOhm·cm$^2$ to only 15 mOhm·cm$^2$.

Thus, the thermo-mechanical treatment had the effect of significantly lowering the contact resistance from a value of about 100 mOhm·cm$^2$ to a value of about 15 mOhm·cm$^2$. Such a value of 15 mOhm·cm$^2$ would never have been reached without this thermo-mechanical treatment, because as explained above, at 800° C. and under the effect of a mechanical stress of 0.1 MPa, the contact resistance has become almost stationary after ten hours with a value in the order of 100 mOhm·cm$^2$.

Moreover, in the graph of FIG. 2, it is noticed that by the end of the thermo-mechanical treatment, the contact resistance slightly fluctuates, then stabilizes at a value of 15 mOhm·cm$^2$. These slight fluctuations may be explained by the fluctuations of temperatures during the thermal stabilization after this thermo-mechanical treatment.

Experiment No 2:

There was provided an experimental device identical to that used for Experiment no 1.

The following operations were carried out successively:

1) In 3 hours, the temperature of the electrochemical device was increased from a temperature of 20° C. to 800° C., and this without applying mechanical stress.

2) The electrochemical device was maintained at 800° C. for 15 hours, and this without applying mechanical stress.

3) The electrochemical device was subjected to the following temperature cycle, and this without applying mechanical stress:

The temperature was increased from 800° C. to 920° C. in 2 hours;
The temperature of 920° C. was maintained for half an hour;
The temperature was decreased from 920° C. to 860° C. in 1 hour;
The temperature of 860° C. was maintained for 1 hour;
Finally, the temperature was decreased from 860° C. to 800° C. in 1 hour.

4) The electrochemical device was maintained at a temperature of 800° C. for one hour.

5) The electrochemical device was maintained at a temperature of 800° C. while concomitantly applying a mechanical stress of 0.1 MPa, and this for 8 hours.

6) While maintaining the mechanical stress of 0.1 MPa, the electrochemical device was subjected to the following temperature cycle:

The temperature was increased from 800° C. to 920° C. in 2 hours;
The temperature of 920° C. was maintained for half an hour;
The temperature was decreased from 920° C. to 860° C. in 1 hour;
The temperature of 860° C. was maintained for 1 hour;
Finally, the temperature was decreased from 860° C. to 800° C. in 1 hour.

In other words, this step 6) corresponded to a thermo-mechanical treatment as implemented in the method for manufacturing contact elements according to the invention.

7) While maintaining the mechanical stress of 0.1 MPa, the electrochemical device was subjected to a temperature of 800° C., and this for further 14 hours.

The contact resistance was measured as soon as a mechanical stress of 0.1 MPa has been applied on the electrochemical device.

Figure 3:
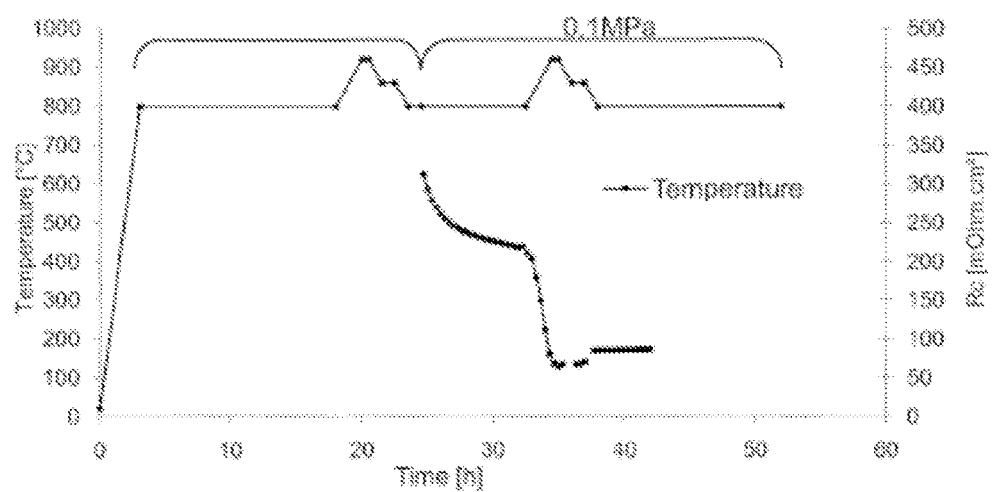
FIG. 3 is a graph of the contact resistance as a function of time, of a deposit of 100 μm of porous LSM whether under the effect or not of a mechanical stress of 0.1 MPa.

In the graph of FIG. 3, the following elements are represented:

The evolution of the temperature as a function of time during steps 1) to 7) as detailed above.

The measured contact resistance as a function of time measured as soon as a mechanical stress has been applied on the electrochemical device (namely from step 5).

According to the graph of FIG. 3, the following points are raised:

The $1^{st}$ contact resistance measurement which was taken as soon as a mechanical stress of 0.1 MPa is applied (hence at the beginning of step 5) when the temperature is of 800° C. has a value in the order of 312 mOhm·cm$^2$.

After 8 hours, while maintaining a temperature of 800° C. and a mechanical stress of 0.1 MPa, the contact resistance decreases by 312 mOhm·cm$^2$ to stabilize at a value in the order of 220 mOhm·cm$^2$.

This value of 220 mOhm·cm$^2$ is greater than the value of 112 mOhm·cm$^2$ which has been measured in Experiment no 1.

Thus, the thermal treatment carried out in steps 3) and 4), hence prior to step 5) had detrimental consequences: the value of the contact resistance obtained after 8 hours while applying a mechanical stress of 0.1 MPa is about two times greater as if there were no this thermal treatment beforehand (the case of Experiment no 1).

Moreover, when the thermo-mechanical treatment of step 6) was carried out on the electrochemical device, the value of the contact resistance obtained at the end of this treatment is in the order of 86 mOhm·cm$^2$. It is also much greater than that obtained at the end of the thermo-mechanical treatment of Experiment no 1.

In other words, the thermo-mechanical treatment performed in step 6) did not allow compensating the consequences of the thermal treatment carried out beforehand on the measurement of the contact resistance.

Thus, it appears from the results obtained during these two experiments that there are the coupled effects of the temperature and of the application of a mechanical stress that affect the value of the contact resistance of a contact element produced from LSM.

In other words, it is thanks to a thermo-mechanical treatment that the LSM layer has been correctly deformed so that its contact resistance is as small as possible, which is the desired effect, because characteristic of a quality contact element.

The invention claimed is:

1. A method for manufacturing a contact element in an electrochemical device which comprises the following steps:
a) there are disposed:
at least one cell comprising a hydrogen electrode-electrolyte-oxygen electrode assembly;
at least a first interconnector;
at least a second interconnector;
b) at least one layer of a conductive material is deposited over the first interconnector and/or the second interconnector;
c) an electrochemical device is assembled by disposing the cell between the first interconnector and the second interconnector so that the conductive material layer is in contact with the oxygen electrode and/or the hydrogen electrode of the cell; and
d) a thermo-mechanical treatment is carried out on the electrochemical device obtained at the end of step c) so as to form at least one contact element constituted of said conductive material and which ensures electrical contact and mechanical accommodation between said interconnectors and said electrodes, the thermo-mechanical treatment comprising concomitantly subjecting the electrochemical device to a temperature comprised between 850° C. and 1200° C. and applying thereto a mechanical stress comprised between 0.01 and 10 MPa,
wherein at the end of the assembly step c) and prior to the step d) of thermo-mechanical treatment, the electrochemical device is heated to a nominal operating temperature comprised between about 600° C. and 900° C.

2. The manufacturing method according to claim 1, wherein the conductive material exhibits, at least for a period of time during the thermo-mechanical treatment of step d), a porosity comprised between 30% and 80%.

3. The manufacturing method according to claim 1, wherein, in step b), at least one conductive material layer is deposited over the first interconnector and in step c), an electrochemical device is constituted by disposing the cell between the first interconnector and the second interconnector so that the conductive material layer is in contact with the oxygen electrode of the cell.

4. The manufacturing method according to claim 1, wherein the conductive material has an electrical conductivity of at least 0.1 S·cm$^{-1}$ under air at 800° C.

5. The manufacturing method according to claim 4, wherein the conductive material is selected from the group consisting of:
$La_{0.6}Sr_{0.4}Co_{0.8}Fe_{0.2}O_3$ (LSCF);
$La_{0.8}Sr_{0.2}Cu_{0.9}Fe_{0.1}O_{2.5}$ (LSCuF);
$La_{0.7}Sr_{0.3}CoO_3$ (LSC);
$Sm_{0.5}Sr_{0.5}CoO_3$ (SSC);
$SmBa_{0.5}Sr_{0.5}Co_2O_5$ (SBSC);
$GdSrCo_2O_5$ (GSC);
$La_{0.65}Sr_{0.3}MnO_3$ (LSM);
$LaBaCo_2O_5$ (LBC);
$YBaCo_2O_5$ (YBC);
$Nd_{1.8}Ce_{0.2}CuO_4$ (NCC);
$La_{0.8}Sr_{0.2}Co_{0.3}Mn_{0.1}Fe_{0.6}O_3$ (LSCMF);
$La_{0.98}Ni_{0.6}Fe_{0.4}O_3$ (LNF);
$La_{1.2}Sr_{0.8}NiO_4$ (LSN);
$La_{0.7}Sr_{0.3}FeO_3$ (LSF); and
$La_2Ni_{0.6}Cu_{0.4}O_4$ (LNC).

6. The manufacturing method according to claim 1, wherein the at least one layer of the conductive material has a porosity comprised between 30% and 80%.

7. The manufacturing method according to claim 1, wherein the at least one layer of the conductive material comprises at least one pore-forming agent.

8. The manufacturing method according to claim 1, wherein the range of heating and/or cooling rate during the step d) of thermo-mechanical treatment is comprised between 0.5° C./min and 500° C./min.

9. The manufacturing method according to claim 1, wherein the range of the mechanical stress applied during the step d) of thermo-mechanical treatment is comprised between 0.05 MPa and 5 MPa.

10. An electrochemical device, equipped with at least one contact element obtained with the manufacturing method according to claim 1.

11. The electrochemical device according to claim 10, wherein the device comprises a SOFC or a HTE.

12. The manufacturing method according to claim 1, wherein the electrochemical device comprises a SOFC or a HTE.

13. The manufacturing method according to claim 1, wherein the nominal operating temperature is between about 600° C. and about 800° C.

14. The manufacturing method according to claim 1, wherein at the end of the step d) of thermo-mechanical treatment, the temperature of the electrochemical device is lowered to the nominal operating temperature of the electrochemical device comprised between about 600° C. and 900° C.

15. The manufacturing method according to claim 14, wherein the nominal operating temperature is between about 600° C. and about 800° C.

16. The manufacturing method according to claim 14, wherein before lowering the temperature of the electrochemical device, the mechanical stress is decreased at most 90%.

17. The manufacturing method according to claim 16, wherein concomitantly subjecting the electrochemical device to the temperature comprised between 850° C. and 1200° C. and applying thereto the mechanical stress comprised between 0.01 and 10 MPa comprises
concomitantly subjecting the electrochemical device to a first temperature between 850° C. and 1200° C. and applying thereto the mechanical stress comprised between 0.01 and 10 MPa; and
concomitantly subjecting the electrochemical device to a second temperature between 850° C. and 1200° C. and applying thereto the mechanical stress comprised between 0.01 and 10 MPa, the second temperature being less than the first temperature.

18. The manufacturing method according to claim 17, wherein before lowering the temperature of the electrochemical device, the mechanical stress is not decreased.

19. The manufacturing method according to claim 17, wherein at the end of the assembly step c) and prior to the step d) of thermo-mechanical treatment, the electrochemical device is heated to the nominal operating temperature comprised between about 600° C. and 900° C. while concomitantly subjecting the electrochemical device to the mechanical stress comprised between 0.01 and 10 MPa.

20. The manufacturing method according to claim 14, wherein before lowering the temperature of the electrochemical device, the mechanical stress is not decreased.

* * * * *